(12) United States Patent
Buhl et al.

(10) Patent No.: US 9,991,691 B2
(45) Date of Patent: Jun. 5, 2018

(54) COMPONENT WITH AT LEAST ONE OPENING

(71) Applicants: CONTI TEMIC MICROELECTRONIC GMBH, Nuremberg (DE); EDEGS FORMENBAU GMBH, Freiberg/Neckar (DE)

(72) Inventors: Joachim Buhl, Nuremberg (DE); Jens Menke, Allersberg (DE); Klaus Scharrer, Hohenstadt-Pommelsbrunn (DE); Matthias Wieczorek, Neunkirchen am Sand (DE); Jan Zenichowski, Pommelsbrunn (DE); Robert Bradic, Sindelfingen (DE); Gerhard Rapp, Freiberg/Neckar (DE)

(73) Assignees: Conti Temic microelectronic GmbH, Nuremberg (DE); EDEGS Formenbau GmbH, Freiberg/Neckar (DE)

( * ) Notice: Subject to any disclaimer, the term of this patent is extended or adjusted under 35 U.S.C. 154(b) by 0 days. days.

(21) Appl. No.: 15/319,921

(22) PCT Filed: Jun. 15, 2015

(86) PCT No.: PCT/EP2015/063346
§ 371 (c)(1),
(2) Date: Dec. 19, 2016

(87) PCT Pub. No.: WO2015/193245
PCT Pub. Date: Dec. 23, 2015

(65) Prior Publication Data
US 2017/0133831 A1    May 11, 2017

(30) Foreign Application Priority Data

Jun. 17, 2014 (DE) .......................... 10 2014 211 593

(51) Int. Cl.
*H02G 15/013* (2006.01)
*H02G 3/08* (2006.01)

(52) U.S. Cl.
CPC ........... *H02G 15/013* (2013.01); *H02G 3/083* (2013.01)

(58) Field of Classification Search
CPC ...... H02G 15/013; H02G 3/083; H02G 3/088; H05K 5/0247
See application file for complete search history.

(56) References Cited

U.S. PATENT DOCUMENTS

| 4,599,487 A | 7/1986 | Blank et al. |
| 5,499,823 A * | 3/1996 | Fukui .................. B60R 16/0222 16/2.1 |

(Continued)

FOREIGN PATENT DOCUMENTS

| CN | 201303240 Y | 9/2009 |
| DE | 2816691 C2 | 3/1983 |

(Continued)

*Primary Examiner* — Hoa C Nguyen
*Assistant Examiner* — Amol Patel
(74) *Attorney, Agent, or Firm* — Laurence A. Greenberg; Werner H. Stemer; Ralph E. Locher

(57) ABSTRACT

A component has at least one opening through which an electric and/or electronic contact element is guided outwards in a sealed manner against the penetration of environmental media. A closed volume is formed at least in a wall of the component in the region of the contact element, and a permanently elastic sealing material which completely surrounds the at least one contact element in at least some sections is filled into said volume.

10 Claims, 7 Drawing Sheets

(56) References Cited

U.S. PATENT DOCUMENTS

| | | | |
|---|---|---|---|
| 6,207,893 B1 | 3/2001 | Guiol | |
| 8,378,239 B2 * | 2/2013 | Lakner | G11B 33/123 174/152 GM |
| 8,851,924 B2 | 10/2014 | Fleischmann et al. | |
| 9,379,480 B2 | 6/2016 | Sato et al. | |

FOREIGN PATENT DOCUMENTS

| | | | | |
|---|---|---|---|---|
| DE | 3412786 | A1 | 10/1985 | |
| DE | 19548503 | A1 | 6/1997 | |
| DE | 10313833 | A1 | 10/2004 | |
| DE | 102004018488 | A1 * | 11/2005 | ......... B60R 16/0222 |
| DE | 202011005480 | U1 | 6/2011 | |
| DE | 202010006401 | U1 | 10/2011 | |
| DE | 102004018488 | B4 | 1/2012 | |
| GB | 2341012 | A | 3/2000 | |
| JP | H10252024 | A | 9/1998 | |
| JP | H10284170 | A | 10/1998 | |
| JP | 2012209508 | A | 10/2012 | |
| WO | 2004084358 | A1 | 9/2004 | |
| WO | 2013191057 | A1 | 12/2013 | |

* cited by examiner

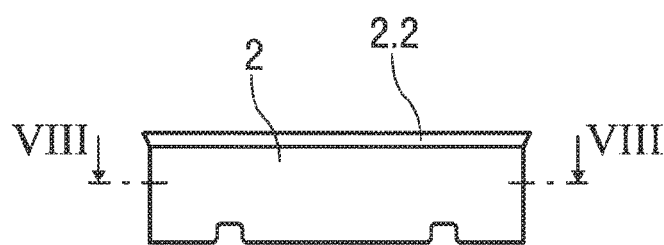
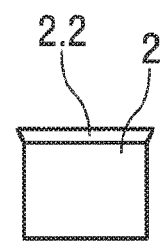
FIG 3  FIG 4
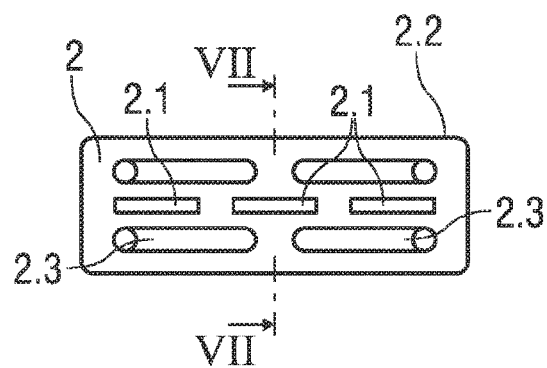
FIG 5

COMPONENT WITH AT LEAST ONE OPENING

BACKGROUND OF THE INVENTION

Field of the Invention

The invention relates to a component with at least one opening through which an electrical and/or electronic contact element is guided outward in a manner sealed with respect to the penetration of environmental media.

DE 10 2004 018 488 B4 discloses a gas-tight and liquid-tight electrical feedthrough of at least one conductor through a wall of a plastics housing. At least in the region of the conductor, the plastics housing has a double-walled configuration, consisting of an inner wall and an outer wall. A permanently elastic material is arranged between the inner wall and the outer wall and surrounds the conductor completely between the inner wall and the outer wall. The conductor is firmly clamped in the manner of a bridge between the inner wall and the outer wall by virtue of the conductor being injection molded into the plastics housing.

BRIEF SUMMARY OF THE INVENTION

The invention is based on the object of specifying an improved component compared to the prior art with at least one opening through which an electrical and/or electronic contact element is guided outward in a manner sealed with respect to the penetration of environmental media.

The object is achieved according to the invention by the features specified in the claims.

Advantageous configurations of the invention are the subject matter of the dependent claims.

A component (structural part) comprises at least one opening through which an electrical and/or electronic contact element is guided outward in a manner sealed with respect to the penetration of environmental media. According to the invention, a closed volume is formed at least in a wall of the component in the region of the contact element, a permanently elastic sealing material which completely surrounds the contact element at least in certain sections being introduced into said volume.

By means of the permanently elastic sealing material, the component has a medium-tight configuration, and therefore the risk of penetration, for example of moisture, into the interior of the component is at least reduced and therefore components arranged in the interior are protected to the greatest possible extent against environmental media. By virtue of the fact that the sealing material is permanently elastic, the volume can be filled in an optimized manner with the sealing material, and therefore the component is sealed and at least a service life of the components in the interior of the component is increased.

In one possible embodiment, the component comprises a cover element with at least one opening through which the at least one contact element is guided, the volume being delimited at least on one side by means of the cover element. The cover element is preferably fastened non-destructively to the component, such that, for example, a defective contact element can be replaced in a comparatively simple manner.

In one development of the component, the cover element comprises at least one sealing edge for preventing leakage of the introduced sealing material from the closed volume.

In particular, leakage of the sealing material as it is being introduced into the volume of the component is prevented to the greatest possible extent by means of the at least one sealing edge.

In a further possible embodiment, the at least one sealing edge is molded onto the cover element, such that the cover element and the at least one sealing edge are formed in one piece. The at least one sealing edge, for example in the form of a sealing lip, is therefore not formed as a separate part, and therefore the number of parts of the component is reduced.

According to one embodiment of the component, the cover element comprises at least one overflow channel connected fluidically to the volume. By means of the overflow channel, it is possible to compensate for an excess of the sealing material introduced into the volume, in particular on account of thermally induced expansion, without the component and/or the cover being damaged.

In a further embodiment, the cover element comprises at least one introduction opening for introducing the sealing material into the volume, such that the volume can be closed by means of the cover element before the sealing material is introduced.

According to a further possible embodiment, the cover element and/or the wall comprises guiding elements for stipulating a direction of flow of the sealing material during the introduction of the latter into the volume. The guiding elements have the effect that the sealing material can be introduced into the volume in the form of a turbulence-free flow, with the formation of air inclusions being excluded to the greatest possible extent.

In one possible embodiment, the permanently elastic sealing material comprises silicone, liquid silicone rubber and/or epoxy resins. The sealing material is permanently elastic and fills the volume to the most complete possible extent, such that the at least one contact element is completely surrounded by the sealing material at least in certain sections.

In addition, the selection of the sealing material makes it possible to realize a seal having a relatively high temperature resistance in the region of the opening for guiding through the at least one contact element, such that the component can be used in an environment both with comparatively high and also low prevailing temperatures.

In one possible development of the component, the latter is formed from plastic and the at least one contact element comprises a lead frame, a wire and/or a strand. Since the component is formed from plastic, it can be produced in an injection molding process, such that the structural par can be produced in a largely automated manner in comparatively short cycle times.

Exemplary embodiments of the invention will be explained in more detail hereinbelow with reference to drawings, in which:

BRIEF DESCRIPTION OF THE SEVERAL VIEWS OF THE DRAWING

Mutually corresponding parts are provided with the same reference signs in all of the figures.

DESCRIPTION OF THE INVENTION

Figure 1:
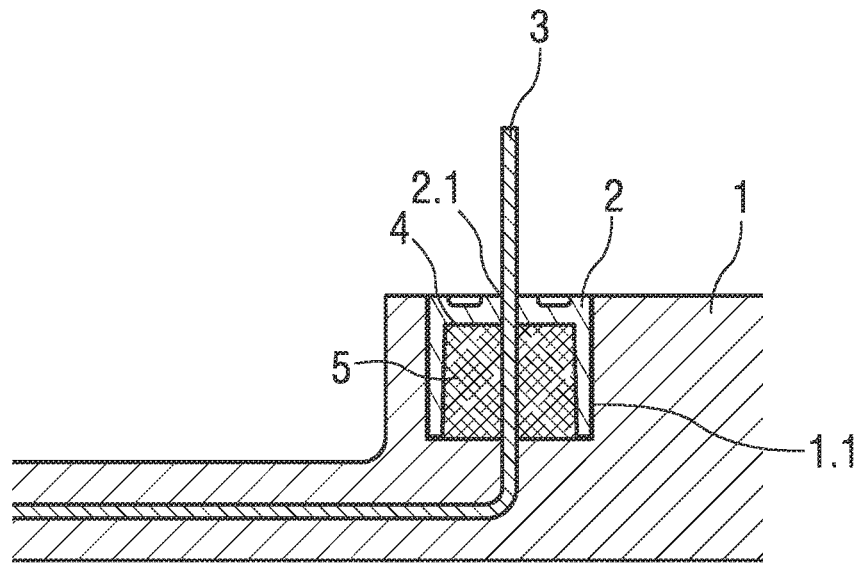
FIG. 1 schematically shows a first sectional illustration of a section of a component in a first embodiment with a cover element and contact elements, FIG. 2 schematically shows a second sectional illustration of a further section of the component in the first embodiment with a cover element and contact elements, FIG. 3 schematically shows a first side view of the cover element, FIG. 4 schematically shows a second side view of the cover element, FIG. 5 schematically shows a plan view of the cover element, FIG. 6 schematically shows a perspective view of the cover element, FIG. 7 schematically shows a first sectional illustration of the cover element, FIG. 8 schematically shows a second sectional illustration of the cover element, FIG. 9 schematically shows a sectional illustration of a section of a component in a second embodiment with a cover element and contact elements, FIG. 10 schematically shows a perspective view of a cover element, FIG. 11 schematically shows a perspective view of the cover element with contact elements guided through, FIG. 12 schematically shows a perspective view of the cover element with the contact elements and anti-rotation protection or an actuating element, FIG. 13 schematically shows a perspective view of the partially assembled component in the second embodiment, and FIG. 14 schematically shows a perspective view of the component in the second embodiment in the assembled state.
Figure 2:
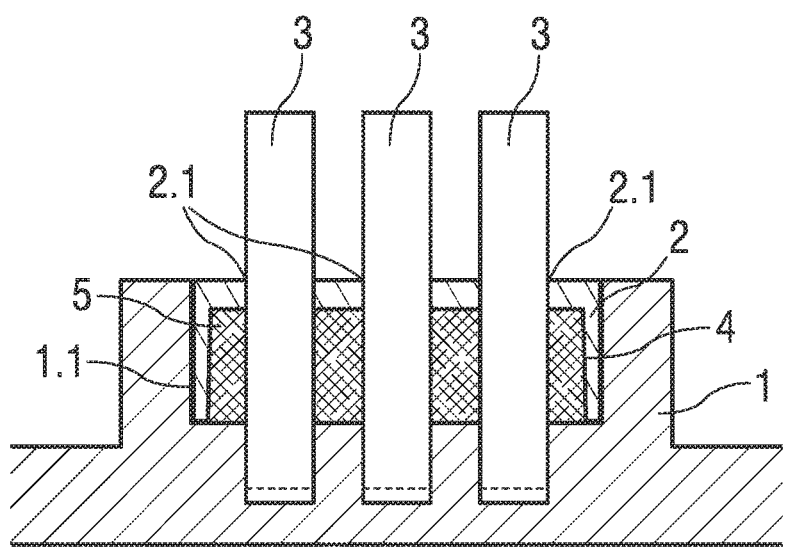

FIG. 1 shows a first sectional illustration of a section of a component 1 (structural part) in a first embodiment with a cover element 2 and three electrical and/or electronic contact elements 3 shown in greater detail in FIG. 2.

The component 1 is what is termed a plug connector of a motor connection, the component 1 being formed essentially from plastic.

The contact elements 3 are formed from copper and are guided through the component 1 and openings 2.1 of the cover element 2, there being the risk that environmental media, such as for example moisture, enter into the component 1 via the openings 2.1, i.e. via the feed through region. This can cause erosion, in particular at the interior section of the contact elements 3, and therefore a service life of the component 1, in particular of the contact elements 3, may be reduced considerably.

In order at least to reduce the risk of penetration of environmental media into the component 1, the component 1 comprises a volume 4 in the form of a chamber, which is closed to the greatest possible extent by means of the cover element 2 and into which a permanently elastic sealing material 5 is introduced. In the process, the permanently elastic sealing material 5, for example silicone, liquid silicone rubber and/or epoxy resins, completely surrounds the contact elements 3 in the section of the volume 4.

The contact elements 3 are guided through the component 1 and the openings 2.1 of the cover element 2, the contact elements 3 protruding out of the component 1 and protruding perpendicularly from the cover element 2 with their exposed end.

The cover element 2 has a substantially box-shaped form and has an open side, its shape corresponding to a cutout 1.1 of the component 1 which forms the volume 4. The cover element 2 can be inserted in a form-fitting manner into the cutout 1.1 and is therefore held therein, the open side being arranged in the direction of the component 1.

It is also conceivable for the cover element 2 to be additionally arranged integrally and/or in a force-fitting manner on the component 1, in particular in the cutout 1.1.

The cover element 2 serves to pre-seal the volume 4 in relation to the component 1 and the contact elements 3.

The component 1 and the cover element 2 form the closed volume 4, which is filled with the sealing material 5 and surrounds the contact elements 3 in the region of the volume 4.

FIG. 2 shows a second sectional illustration of a section of the component 1.

In detail, FIG. 2 shows the three contact elements 3 guided through the component 1, the volume 4 with the sealing material 5 and the openings 2.1 of the cover element 2 alongside one another.

Figure 6:
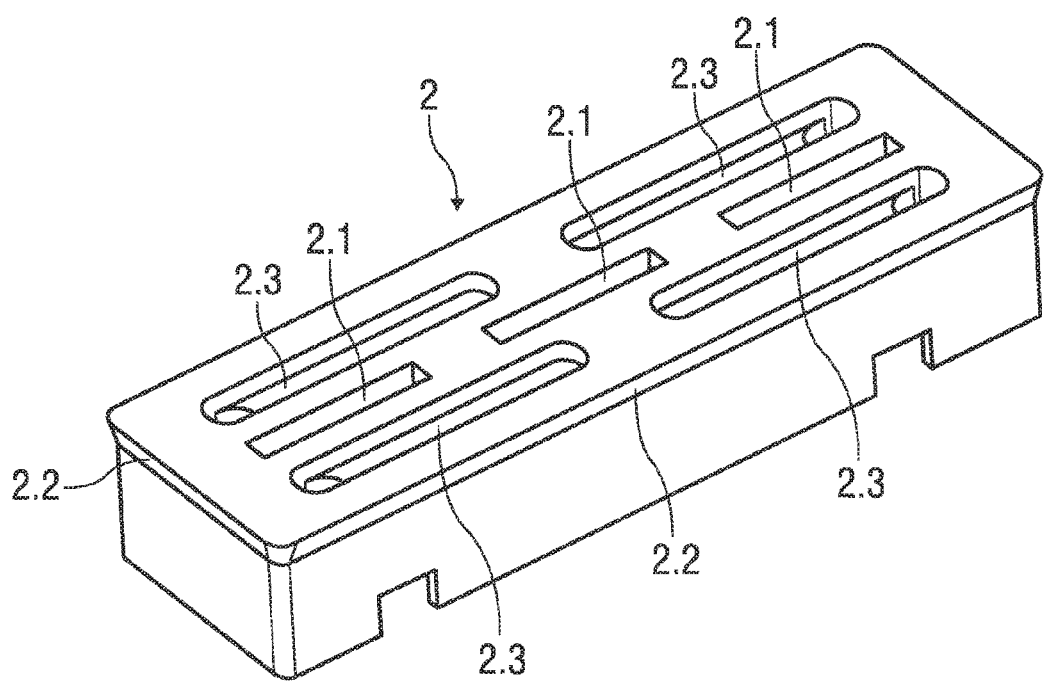

FIGS. 3 to 6 each show a view of the cover element 2, FIG. 3 showing a first side view, FIG. 4 showing a second side view, FIG. 5 showing a plan view and FIG. 6 showing a perspective view.

At a region which lies opposite the open side of the cover element 2 and which, in the inserted state, terminates substantially flush with the component 1, a sealing edge 2.2 is formed.

The sealing edge 2.2 prevents escape of the sealing material 5 after it has been introduced into the volume 4.

As described above, FIG. 5 shows a plan view of the cover element 2. In addition to the openings 2.1, overflow channels 2.3 are made in a top side of the cover element 2, such that an excess of the sealing material 5, for example upon expansion of the sealing material 5, can pass outward via the overflow channels 2.3 connected fluidically to the volume 4.

The volume 4 which is substantially closed by means of the cutout 1.1 in the component 1 and the cover element 2 can be filled by way of a through-hole in the cover element 2, for example an overflow channel 2.3 and/or an introduction opening not shown in more detail.

In addition, the volume 4 can be ventilated by way of at least one ventilation opening, this being the introduction opening and/or at least one overflow channel 2.3.

As an alternative or in addition, the volume 4 can also be filled via an introduction opening made in the component 1.

The sealing material 5 can be introduced into the volume 4 by being pressed in and/or by means of a negative pressure generated in the volume 4, it being possible to carry out the filling operation, in particular the pressing of the material into the volume 4, by means of a spraying machine and/or another metering apparatus.

Figure 7:
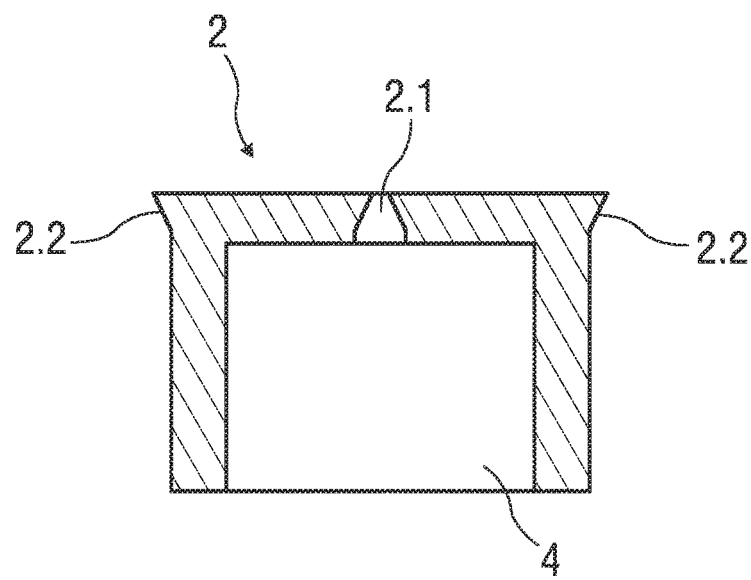
Figure 8:
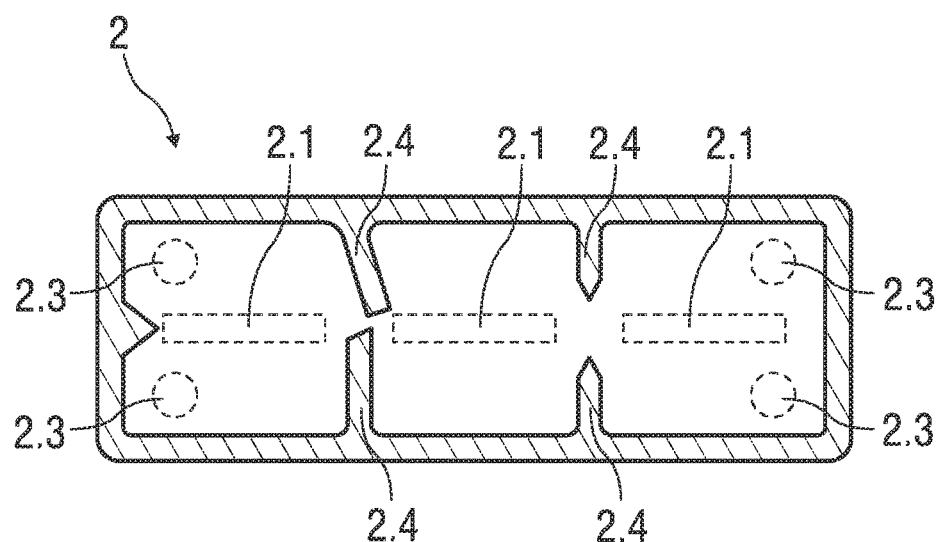

FIG. 7 shows a first sectional illustration and FIG. 8 shows a second sectional illustration of the cover element 2.

FIG. 8 shows that guiding elements 2.4 for stipulating a direction of flow during the introduction of the sealing material 5 are integrally formed, preferably formed, on side walls of the cover element 2.

Alternatively, provided that the component 1 itself forms the closed volume 4, the guiding elements 2.4 can be integrally formed or formed on the walls of the component 1 which delimits the volume 4.

By means of the guiding elements 2.4, it can essentially be ensured that the sealing material 5 can be introduced into the volume 4 without turbulences and the risk of air inclusions is at least reduced.

During the production of the component 1 and an intended use of the cover element 2, it can be provided that the latter is introduced into or placed on the cutout 1.1 of the component 1 in an automated series production process. As described above, the volume 4, in particular in the automated series production process, can be filled by means of a spraying machine and/or another metering apparatus.

Figure 9:
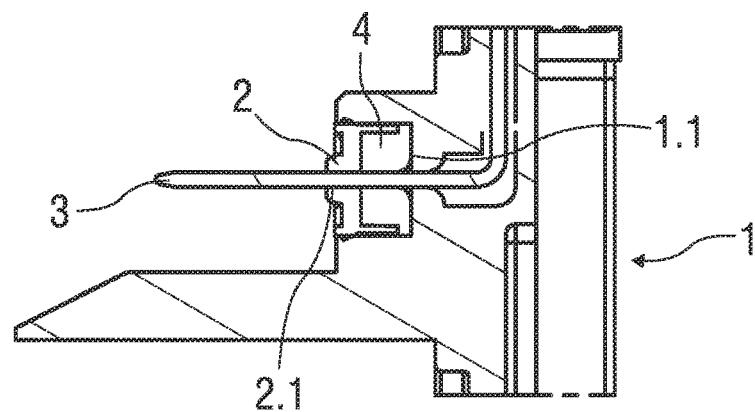

FIG. 9 shows a sectional illustration of a component 1 in a second embodiment.

Here, too, provision is made of three contact elements 3, which are guided through the cutout 1.1 of the component 1 which forms the volume 4 and through the openings 2.1 of the cover element 2.

Figure 10:
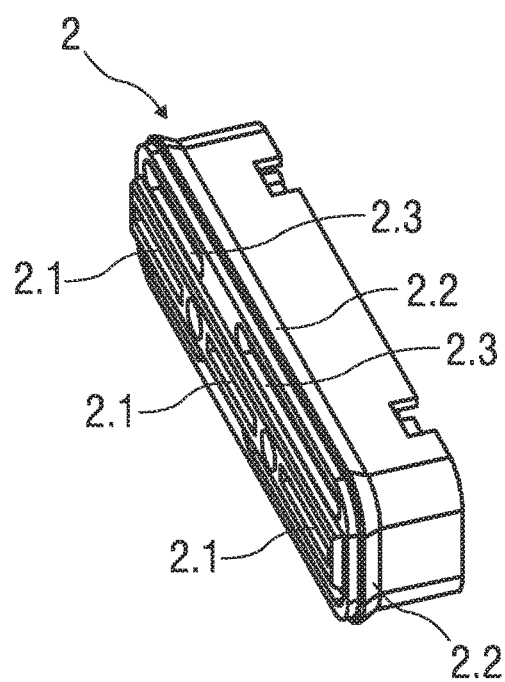
Figure 11:
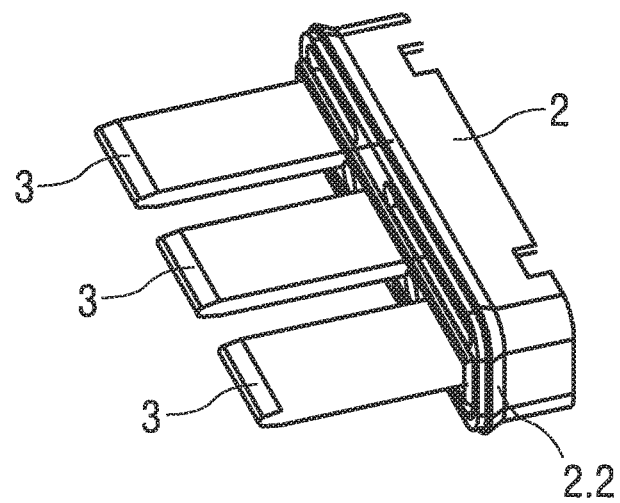

FIG. 10 shows a perspective view of the cover element 2 and FIG. 11 shows a perspective view of the cover element 2 with the contact elements 3 guided through the openings 2.1.

Figure 12:
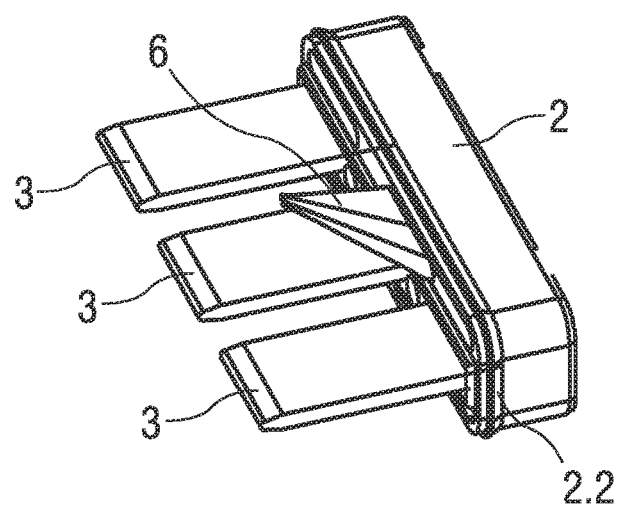

FIG. 12 shows the cover element 2 with the contact elements 3 and anti-rotation protection, an insertion aid and/or another actuating element 6.

Figure 13:
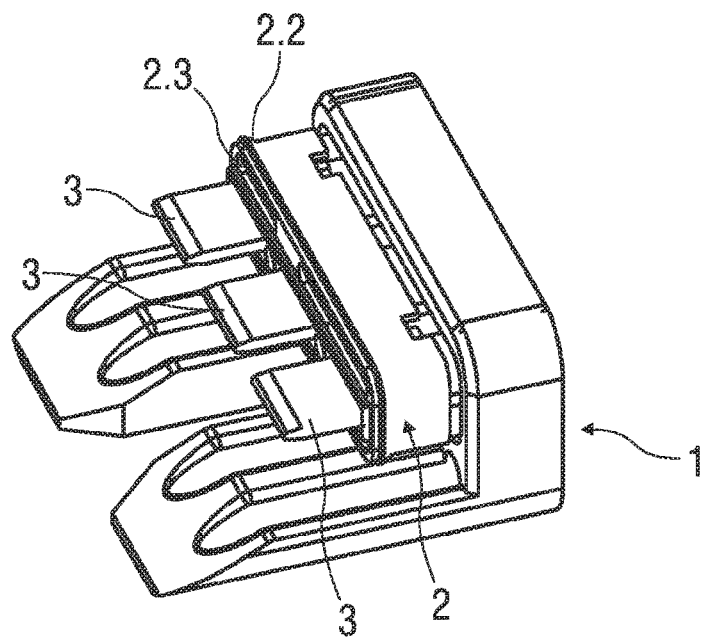
Figure 14:
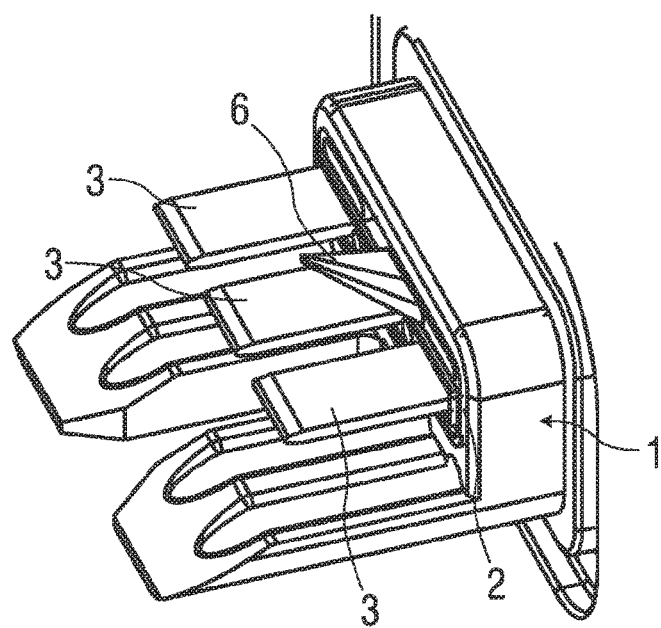

The component 1 is shown in the partially assembled state in FIG. 13 and in the assembled state in FIG. 14, with FIG. 14 showing a section of the component 1 in the second embodiment.

The risk of penetration of environmental media, for example moisture, via the openings 2.1 into the component 1 is at least reduced by means of the component 1 with the closed volume 4 and the contact elements 3, which are surrounded by sealing material 5 which has been introduced into the volume 4.

The sealing material 5 is a temperature-resistant sealing material 5, and therefore it is possible to essentially ensure the sealing of the contact elements 3 irrespective of the site of use and a prevailing temperature in which the component 1 is situated.

LIST OF REFERENCE SIGNS 1 component
1.1 Cutout
2 Cover element
2.1 Opening
2.2 Sealing edge
2.3 Overflow channel
2.4 Guiding element
3 Contact element
4 Volume
5 Sealing material
6 Actuating element

The invention claimed is:

1. A component, comprising:
a component part having a wall formed with at least one opening;
at least one electrical and/or electronic contact element guided outwardly through said at least one opening;
a cover for closing off said at least one opening and defining a closed volume in said component wall in a region of said contact element, said cover having at least one insertion opening configured for slideable insertion of said electrical and/or electronic contact element;
wherein said cover element is formed with at least one introduction opening for introducing sealing material into said volume;
a permanently elastic sealing material disposed in said closed volume and completely surrounding said at least one contact element at least in certain sections and sealing said at least one contact element outwardly against a penetration of environmental media.

2. The component according to claim 1, wherein said component part is a cover element with said at least one opening through which said at least one contact element is guided, and said volume is delimited at least on one side by said cover element.

3. The component according to claim 2, wherein said cover element has at least one sealing edge configured to prevent leakage of said sealing material after introduction thereof from said closed volume.

4. The component according to claim 2, wherein said cover element is formed with at least one overflow channel fluidically connected to said volume.

5. The component according to claim 2, wherein said cover element and/or said wall comprises guiding elements for stipulating a direction of flow of said sealing material during an introduction of said sealing material into said volume.

6. The component according to claim 1, wherein said permanently elastic sealing material is at least one material selected from the group consisting of silicone, liquid silicone rubber, and epoxy resins.

7. A component, comprising:
a component part having a wall formed with at least one opening;
at least one electrical and/or electronic contact element guided outwardly through said at least one opening;
a cover for closing off said at least one opening and defining a closed volume in said component wall in a region of said contact element, said cover having at least one insertion opening configured for slideable insertion of said electrical and/or electronic contact element;
a permanently elastic sealing material disposed in said closed volume and completely surrounding said at least one contact element at least in certain sections and sealing said at least one contact element outwardly against a penetration of environmental media;
said component part being a cover element with said at least one opening through which said at least one contact element is guided, and said volume being delimited at least on one side by said cover element;
said cover element having at least one sealing edge configured to prevent leakage of said sealing material after introduction thereof from said closed volume, said at least one sealing edge being molded onto said cover element.

8. The component according to claim 7, wherein said cover element is formed with at least one introduction opening for introducing said sealing material into said volume.

9. A component, comprising:
a component part having a wall formed with at least one opening;
at least one electrical and/or electronic contact element guided outwardly through said at least one opening;
a cover for closing off said at least one opening and defining a closed volume in said component wall in a region of said contact element, said cover having at least one insertion opening configured for slideable insertion of said electrical and/or electronic contact element;
a permanently elastic sealing material disposed in said closed volume and completely surrounding said at least one contact element at least in certain sections and sealing said at least one contact element outwardly against a penetration of environmental media;

wherein said component part is formed of plastic and said at least one contact element is at least one element selected from the group consisting of a lead frame, a wire and a strand.

10. A component, comprising:

a component part being a cover element having a wall formed with at least one opening;

at least one electrical and/or electronic contact element guided outwardly through said at least one opening;

a closed volume formed in said wall in a region of said contact element and delimited at least on one side by said cover element;

a permanently elastic sealing material disposed in said closed volume and completely surrounding said at least one contact element at least in certain sections and sealing said at least one contact element against a penetration of environmental media; and said cover element and/or said wall including guiding elements for stipulating a direction of flow of said sealing material during an introduction of said sealing material into said volume.

* * * * *